United States Patent
Giesmann et al.

(10) Patent No.: US 9,527,536 B1
(45) Date of Patent: Dec. 27, 2016

(54) TELESCOPIC WHEEL HUB

(71) Applicant: Deere & Company, Moline, IL (US)

(72) Inventors: Kendall L. Giesmann, Waverly, IA (US); Dennis A. Bowman, Denver, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/833,456

(22) Filed: Aug. 24, 2015

(51) Int. Cl.
  *B60B 35/12* (2006.01)
  *B62D 49/06* (2006.01)

(52) U.S. Cl.
  CPC ........... *B62D 49/0678* (2013.01); *B60B 35/12* (2013.01)

(58) Field of Classification Search
  CPC ... B62D 49/0678; B60B 35/12; B60B 35/121; B60B 35/122; B60B 35/124; B60B 35/125
  See application file for complete search history.

(56) References Cited

U.S. PATENT DOCUMENTS

| | | | | |
|---|---|---|---|---|
| 2,151,045 A * | 3/1939 | Ploehn | ................ | B60B 27/0026 301/128 |
| 4,986,386 A * | 1/1991 | Iwamoto | ............... | B60B 35/001 180/209 |
| 5,121,808 A * | 6/1992 | Visentini | ............... | B60B 35/003 180/435 |
| 5,236,059 A * | 8/1993 | Overocker | ............... | B62D 7/20 180/209 |
| 5,464,243 A * | 11/1995 | Maiwald | ............. | B60B 35/1018 180/906 |
| 5,489,114 A * | 2/1996 | Ward | .................. | B60B 35/1054 180/209 |
| 6,199,769 B1 * | 3/2001 | Weddle | ............. | B60G 17/0416 180/906 |
| 6,206,125 B1 * | 3/2001 | Weddle | ................. | B60B 35/001 180/209 |
| 6,386,554 B1 * | 5/2002 | Weddle | ................ | B60G 17/033 280/124.161 |
| 6,715,576 B2 * | 4/2004 | Filho | ................... | B60B 35/1036 180/209 |
| 8,398,179 B2 | 3/2013 | Mackin et al. | | |
| 9,156,312 B1 * | 10/2015 | Ruggeri | ................. | B60B 35/16 |
| 2001/0054525 A1 * | 12/2001 | Honzek | ................ | B60B 35/003 180/417 |
| 2003/0020324 A1 * | 1/2003 | Radke | ..................... | B60B 11/02 301/128 |
| 2004/0130114 A1 * | 7/2004 | Weichholdt | ............. | B60G 9/02 280/86.751 |

(Continued)

FOREIGN PATENT DOCUMENTS

WO    2005068278    7/2005

*Primary Examiner* — Kevin Hurley
*Assistant Examiner* — Gabriela C Craciun

(57) ABSTRACT

A telescopic axle assembly includes a knuckle housing pivotally mounted to a vehicle frame. The knuckle housing projects therefrom. A rotary drive shaft extends through the knuckle housing and the sleeve. A first wheel hub housing is slidably coupled to the knuckle housing and has a bore which slidably receives the sleeve. A second wheel hub housing is rotatably mounted to the first wheel hub housing. A transmission transmits torque between the drive shaft and the second wheel hub housing. Hydraulic cylinders move the wheel hub housings with respect to the knuckle housing and the drive shaft.

11 Claims, 4 Drawing Sheets

(56) References Cited

U.S. PATENT DOCUMENTS

| | | | |
|---|---|---|---|
| 2010/0075727 A1* | 3/2010 | Coers | A01D 41/12 460/150 |
| 2011/0133416 A1* | 6/2011 | Hiddema | A01C 23/008 280/5.508 |
| 2011/0272905 A1* | 11/2011 | Mackin | A01D 41/12 280/124.11 |
| 2011/0273003 A1* | 11/2011 | Mackin | A01D 41/12 301/128 |
| 2016/0096407 A1* | 4/2016 | Dames | B60G 3/20 280/838 |
| 2016/0096547 A1* | 4/2016 | Dames | B62D 7/146 280/86.758 |

* cited by examiner

TELESCOPIC WHEEL HUB

TECHNICAL FIELD

The present disclosure relates to a telescopic axle assembly for a driven steerable wheel.

BACKGROUND

Tractors are used in North America for row crop farming. Such a tractor should be able to have wheel tread spacings to accommodate crops grown in 30 inch row spacings, such as corn and soybeans. Larger and more powerful tractors require larger tire sizes to support the increased weight and to prevent soil compaction. As front tires increase in diameter on the steerable front axle, the maximum tractor turn angle decreases because the tire will contact the chassis of the tractor when adjusted to a 60 inch tread setting. In such cases, the maximum turn angle can be increased by moving the tires outwardly and away the tractor chassis. But, this results in a larger wheel spacing, and such a larger wheel spacing may make the tractor too wide for transporting along a road or highway. Thus, it is desired to provide a mechanism which can temporarily increase the maximum turn angle by increasing wheel spacing, such as during a turn.

SUMMARY

According to an aspect of the present disclosure, a telescopic axle assembly is provided for a driven steerable wheel. The axle assembly includes a knuckle housing pivotally mounted to a vehicle frame. A drive shaft is rotatably received by the knuckle housing. The drive shaft extends through the knuckle housing. A first wheel hub housing is slidably coupled to the knuckle housing. A second wheel hub housing is rotatably mounted to the first wheel hub housing. A transmission transmits torque between the drive shaft and the second wheel hub housing. An actuator axially moves the wheel hub housings with respect to the knuckle housing and the drive shaft.

The actuator includes a plurality of hydraulic cylinders which are coupled between the knuckle housing and the first wheel hub housing. Each hydraulic cylinder includes a hollow piston sleeve which projects from the knuckle housing, and a piston shaft which is slidably and sealingly received by the piston sleeve. Each piston shaft projects from the first wheel hub housing.

A hollow shaft is axially fixed with respect to the wheel hub housings. The hollow shaft has a sun gear formed on an outer surface thereof. The hollow shaft slidably receives the drive shaft, and the hollow shaft has inner splines which slidably and meshingly engage outer gear teeth formed on the drive shaft. A ring gear is supported on the first wheel hub housing. A planet gear is meshingly coupled with the ring gear and with the sun gear.

The hub assembly can be extended to provide a wider wheel tread spacing during a turn which allows more clearance between the tires and the vehicle body. This permits a greater wheel turn angle, and therefore a shorter turn radius for the vehicle. In row crop farming the operator begins to turn the tractor and reverse direction at the field headland. The wider front wheel tread should occur at the headland when the operator is crossing turn rows. This extension should be initiated when the turn angle exceeds a value where beyond this value interference would occur. As the tractor completes the turn and is headed back in the opposite direction the front wheels should be returned to their original narrower spacing to fit between the spaced row crops. A linear position sensor can be placed on each telescopic hub for feedback and control of the hydraulic cylinders used to extend it. Since resistance force to extending the two telescopic hubs may vary, control logic can be used to compare the position of each and use a flow divider in the hydraulic circuit to 'pulse' hydraulic flow to the hub which is not in 'sync' with the other.

DETAILED DESCRIPTION OF THE DRAWINGS

At least one example embodiment of the subject matter of this disclosure is understood by referring to FIGS. 1 through 4 of the drawings.

Figure 1:
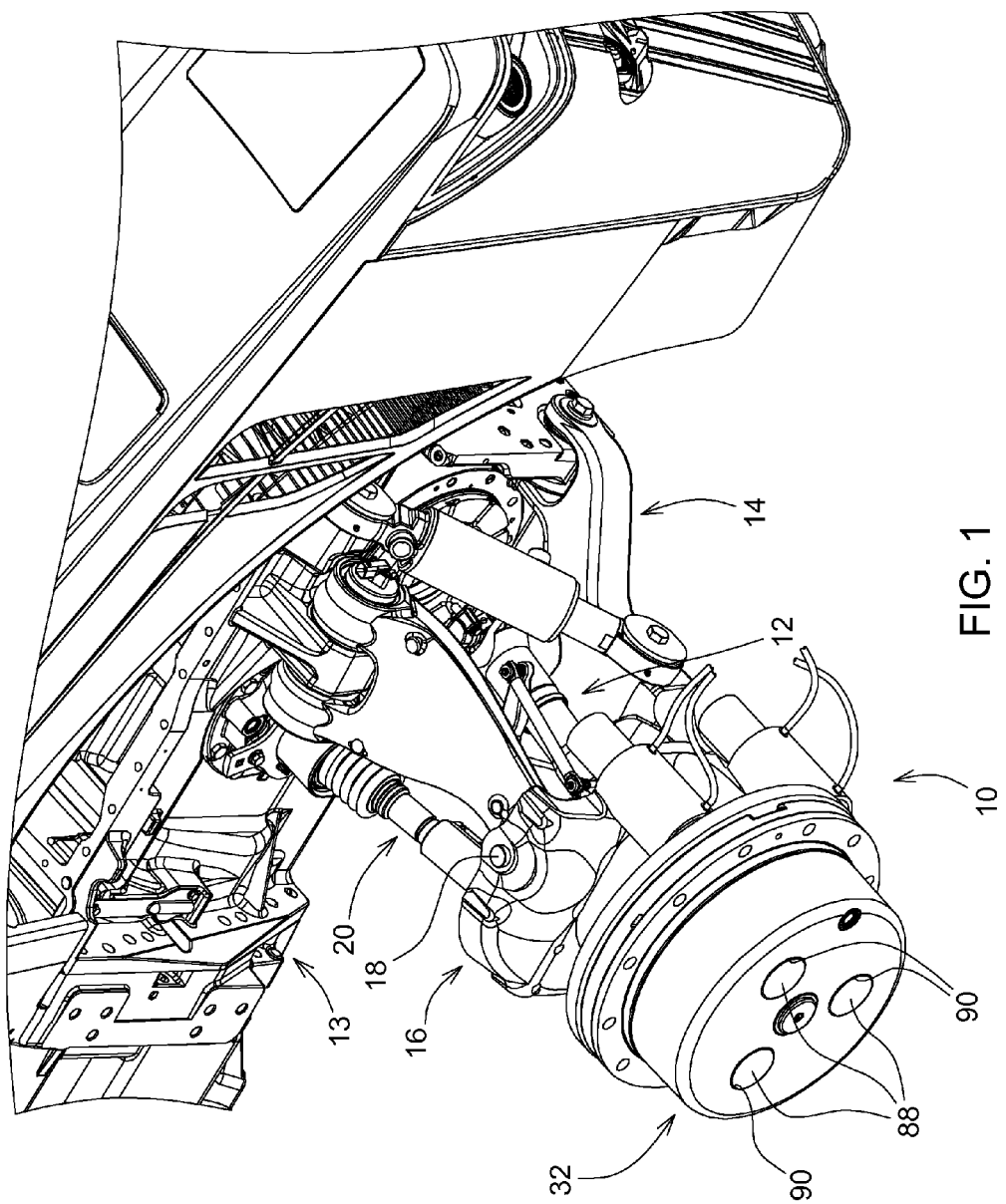
FIG. 1 is a perspective view of a telescopic wheel hub assembly embodying the invention and mounted to vehicle frame by an A-arm suspension.
Figure 2:
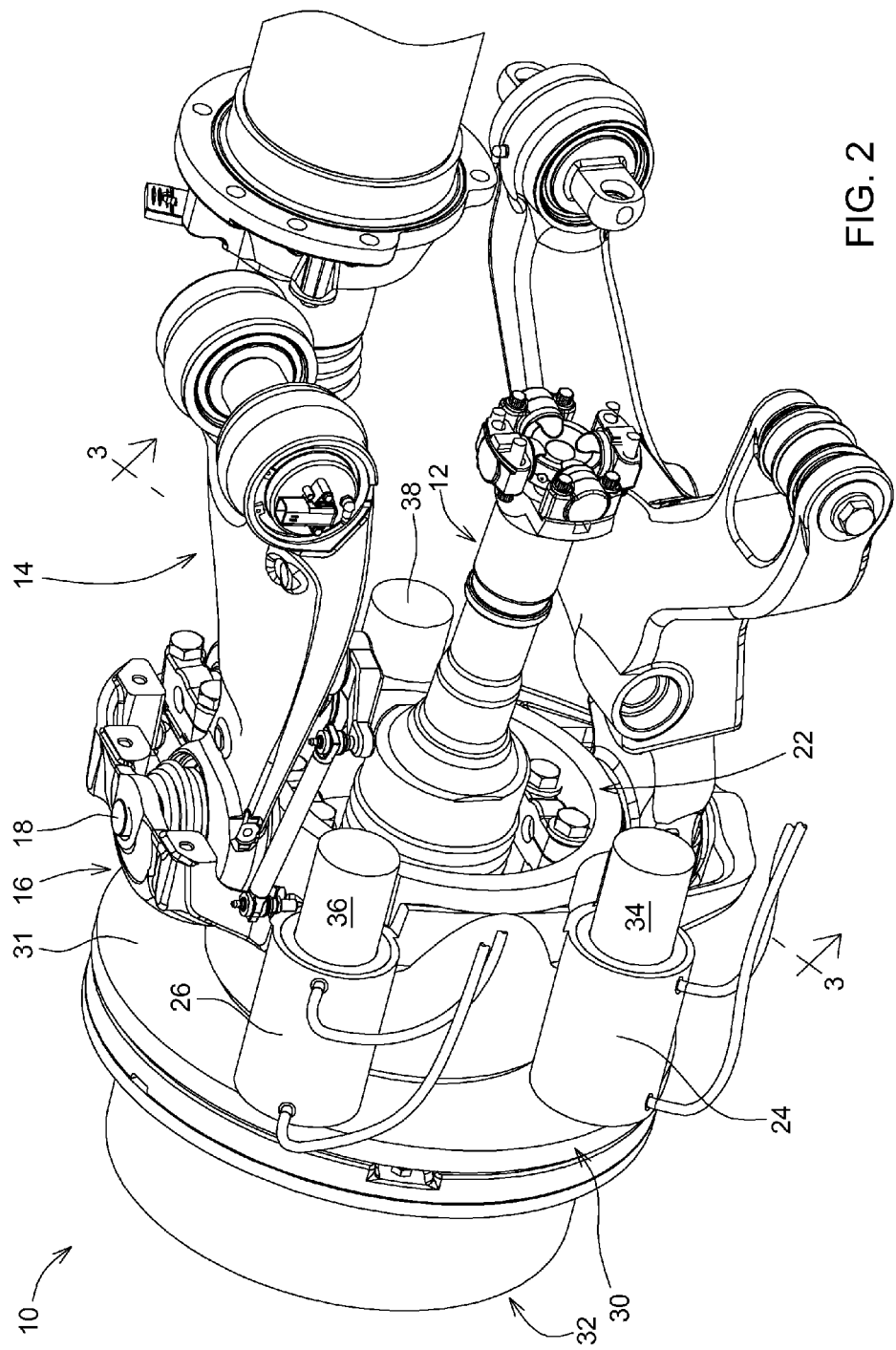
FIG. 2 is a perspective view of the telescopic wheel hub assembly of FIG. 1.

Referring to FIGS. 1 and 2, a hydraulically actuated telescopic wheel hub assembly 10 is connected to a drive shaft 12. The wheel hub assembly 10 is coupled to a vehicle frame 13 by a conventional steerable mechanical front wheel A-arm suspension 14. The wheel hub assembly 10 includes a knuckle housing 16 which pivots about a kingpin 18 and is coupled to a conventional steering link 20. The knuckle housing 16 does not rotate about the axis of the drive shaft 12.

Figure 3:
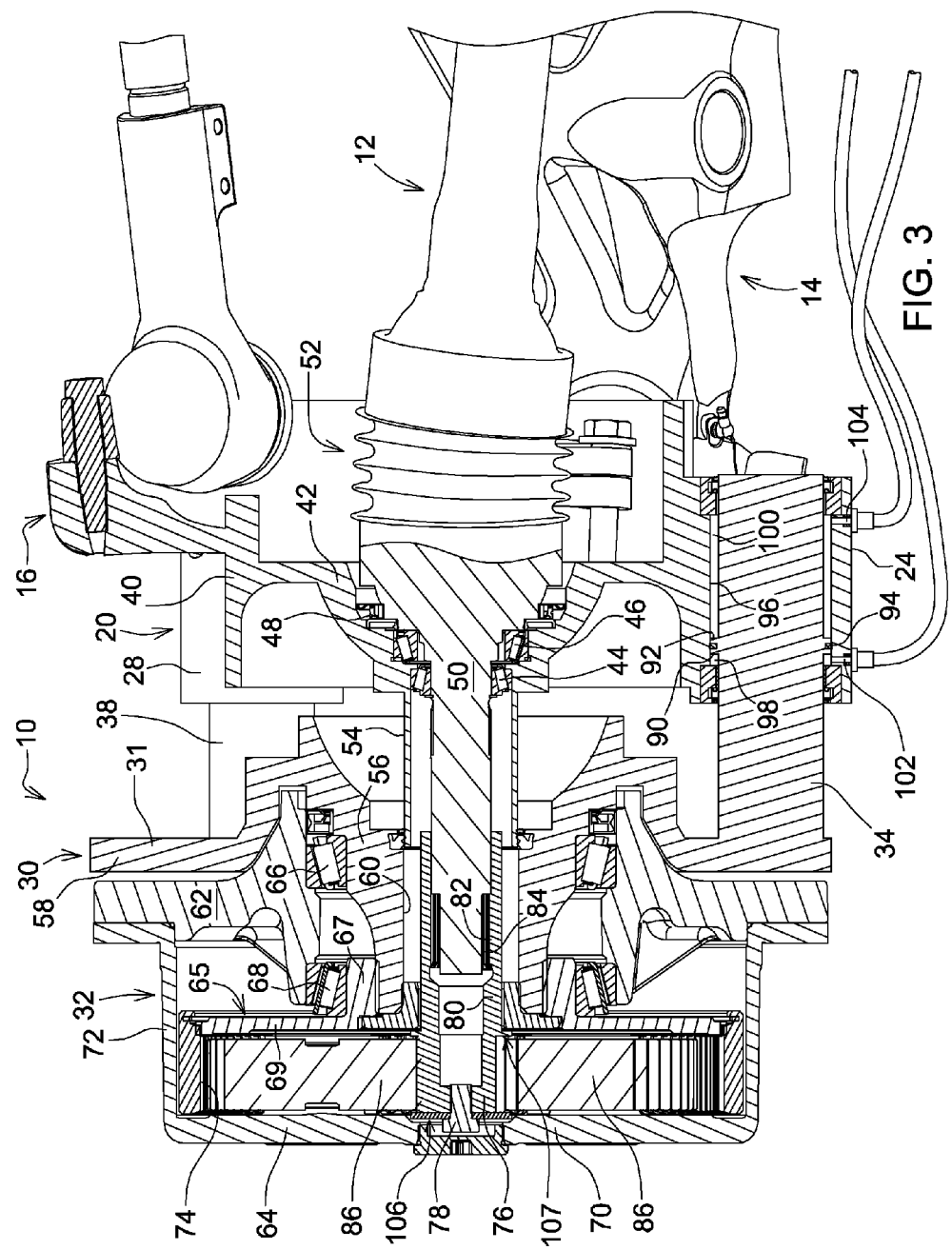
FIG. 3 is a view taken along lines 3-3 of FIG. 2.

Referring to FIGS. 2 and 3, the housing 16 includes a generally cylindrical main housing 22 and a plurality of hollow cylinder housings 24, 26 and 28 which are arranged around the outer periphery of the main housing 22.

The wheel hub assembly 10 also includes a non-rotating generally cylindrical hollow first wheel hub housing 30 and a rotating generally cylindrical hollow second wheel hub housing 32. The first wheel hub housing 30 includes a generally cylindrical main housing 31 and a plurality of piston members 34, 36 and 38 which are arranged around the outer periphery of the main housing 31. Each piston member 34, 36 and 38 is slidably received by a corresponding one of the cylinder housings 24, 26 and 28. The wheel hub housing 32 is adapted to mount to a wheel and tire assembly (not shown).

Figure 4:
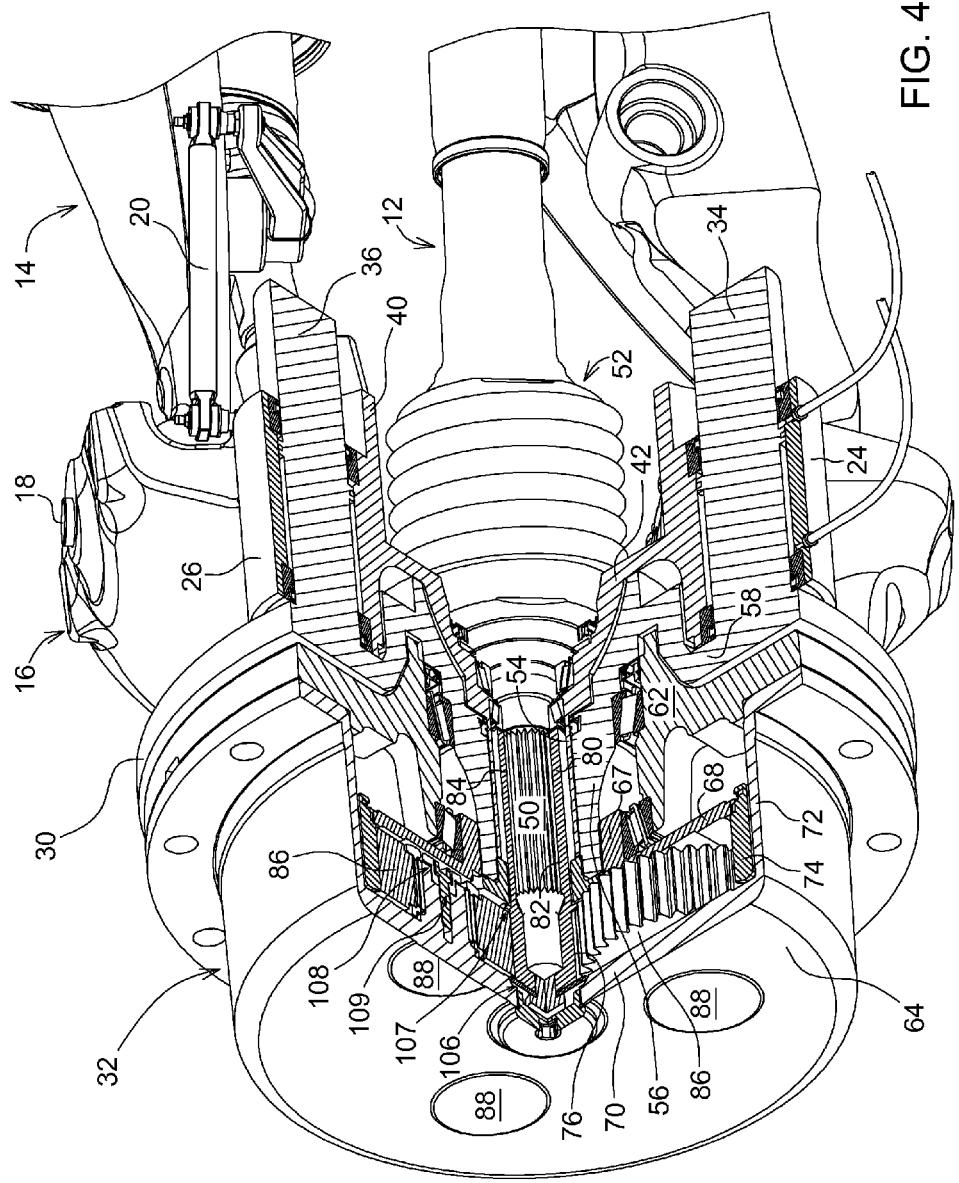
FIG. 4 is a perspective sectional view of the telescopic wheel hub assembly of FIG. 1.

Referring now to FIGS. 3 and 4, the housing 16 includes an outer part 40 which surrounds and is connected to an inner part 42. The inner part 42 supports bearings 44, 46 and seal 48 which rotatably support an axially outer drive shaft 50. A double cardan joint 52 couples the drive shaft 50 to the drive shaft 12. A cylindrical sleeve 54 projects axially away from inner part 42 and towards the first wheel hub housing 30. The drive shaft 50 extends through and is received by the sleeve 54.

The first wheel hub housing 30 includes a hollow central hub 56 and an outer flange 58. A central bore 60 extends axially through the hub 56 which slidably receives the sleeve 54.

The second wheel hub housing 32 includes a hollow first part 62 fixed to a hollow second part 64. The first part 62 is supported for rotation on the hub 56 by bearing 66. The first part 62 is also supported for rotation by bearing 68. The second part 64 has a circular end plate 70 and an outer rim 72. A hollow ring gear hub 65 has a hollow hub 67 and a circular plate 69. Hub 67 is non-rotatably mounted or splined to the hub 56 and supports bearing 68. The outer portion of plate 69 is splined to the non-rotating ring gear 74. A sun gear 76 is trapped to move axially with the planet gears 86 due to the bolt 78 and washer 106 at its outboard end and the shoulder 107 on its inboard side. A hollow sun gear shaft 80 extends axially away from the sun gear 76 and towards the drive shaft 50. Internal splines or gear teeth 82 are formed on an inner surface of sun gear shaft 80. Splines 82 slidingly and meshingly engage outer splines 84 formed on an outer surface of the drive shaft 50. Planet gears 86 are mounted for rotation on planet shafts 88 which protrude from the end plate 70. The planet gears 86 engage the non-rotating ring gear 74. The planet gears 86 are prevented from sliding off the ends of the planet shafts 88 by retainers 108 and screws 109. Thus, rotation of the drive shaft 50 also causes the planet gears 86 to orbit, and causes rotation of the wheel hub housing 32.

As best seen in FIG. 3, piston member 34 extends through hollow cylinder housing 24. Annular lands 90 and 92 are formed on the piston member 34. An annular seal member 94 is received in a groove between lands 90 and 92. Seal 94 sealingly engages the inner surface 96 of cylinder housing 24 and divides the interior of cylinder housing 24 into chambers 98 and 100. A port 102 communicates chamber 98 with a controlled source of hydraulic pressure. A port 104 communicates chamber 100 with a controlled source of hydraulic pressure. When chamber 100 is pressurized, the piston member 34 is moved to the left, viewing FIG. 3, and the wheel hub housing 32 is moved away from the vehicle frame 13 to the extended position shown in FIG. 3. When chamber 98 is pressurized, the piston member 34 is moved to the right, viewing FIG. 3, and the wheel hub housing 32 is moved towards the vehicle frame 13 to the retracted position.

The result is a hydraulically actuated telescopic wheel hub assembly which may be attached to the ends of a mechanically driven steerable front axle with independent suspension for a vehicle. The hub can be extended to provide a wider spacing of the wheels which in turn allows a larger wheel turn angle and smaller vehicle turn radius. Thus, with this invention the maximum turn angle can be increased by extending the telescopic wheel hub to increase wheel spacing only during a turn to provide clearance with respect to the chassis. This wheel spacing increase can be initiated when the turn angle exceeds the angle at which interference would otherwise occur. The telescopic wheel hub can be retracted to decrease the wheel spacing and decrease turn clearance when the turn angle decreases below the initiation value. This invention may also be used to increase wheel spacing to improve the stability of a tractor with any tread spacing.

Two of these wheel hub assemblies may be mounted on the ends of a steerable mechanical front wheel drive axle. The extension of the hub assembly may be initiated by a rotary potentiometer (not shown) which measures the wheel position or turn angle. During the extension of the hub housing 32 must extend. This is done by having the sun gear 76 extend with the hub housing 32 on the splined driveshaft 50. The position of the CV joint 52 of the drive line 12 is held fixed with respect to the axis of the kingpin 18. The tractor weight at each wheel is supported by three piston shafts 34, 36 and 38 which are received by cylinder housings 24, 26 and 28 which are part of the knuckle housing 16. Thus, the steering cylinder and tie rods do not have to change length as the hubs (wheels) are extended and steered.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A telescopic axle assembly for a driven steerable wheel, said axle assembly comprising:
   a knuckle housing pivotally mounted to a vehicle frame;
   a drive shaft rotatably received by the knuckle housing, the drive shaft extending through the knuckle housing;
   a first wheel hub housing slidably coupled to the knuckle housing;
   a second wheel hub housing rotatably mounted to the first wheel hub housing;
   a transmission which transmits torque between the drive shaft and the second wheel hub housing; and
   an actuator for axially moving the wheel hub housings with respect to the knuckle housing and the drive shaft.

2. The axle assembly of claim 1, wherein:
   the actuator comprises a hydraulic cylinder which is coupled between the knuckle housing and the first wheel hub housing.

3. The axle assembly of claim 2, wherein:
   the hydraulic cylinder comprises a hollow piston sleeve which projects from the knuckle housing, and a piston shaft which is slidably and sealingly received by the piston sleeve, the piston shaft projecting from the first wheel hub housing.

4. The axle assembly of claim 1, wherein:
   a cylindrical sleeve projects outwardly from a side of the knuckle housing; and
   the drive shaft extends through the knuckle housing and the sleeve.

5. The axle assembly of claim 1, wherein:
   a cylindrical sleeve projects outwardly from a side of the knuckle housing; and
   the first wheel hub housing has a bore which slidably receives the sleeve.

6. The axle assembly of claim 1, wherein:
   the drive shaft has outer gear teeth formed on an outer end thereof; and
   a hollow shaft is fixed with respect to the second wheel hub housing, the hollow shaft having internal spines which mesh with the outer gear teeth of the drive shaft.

7. The axle assembly of claim 1, wherein:
   a hollow shaft is axially fixed with respect to the wheel hub housings, the hollow shaft having a sun gear formed on an outer surface thereof, the hollow shaft slidably receiving the drive shaft, and the hollow shaft having inner splines which slidably and meshingly engage outer gear teeth formed on the drive shaft;
   a ring gear is supported on the first wheel hub housing; and
   a planet gear is meshingly coupled with the ring gear and with the sun gear.

8. The axle assembly of claim 7, wherein:
the hollow shaft slidably receives the drive shaft, and the hollow shaft having inner splines which slidably and meshingly engage outer gear teeth formed on the drive shaft.

9. The axle assembly of claim 1, wherein:
the actuator comprises a plurality of actuator units spaced apart from each other and arranged around an outer surface of the knuckle housing.

10. A telescopic axle assembly for a driven steerable wheel, said axle assembly comprising:
- a knuckle housing pivotally mounted to a vehicle frame, the knuckle housing having a cylindrical sleeve which projects therefrom;
- a drive shaft rotatably received by the knuckle housing, the drive shaft extending through the knuckle housing and the sleeve;
- a first wheel hub housing slidably coupled to the knuckle housing, the first wheel hub housing having a bore which slidably receives the sleeve;
- a second wheel hub housing rotatably mounted to the first wheel hub housing;
- a transmission which transmits torque between the drive shaft and the second wheel hub housing; and
- an actuator for axially moving the wheel hub housings with respect to the knuckle housing and the drive shaft, the actuator comprising a hydraulic cylinder which is coupled between the knuckle housing and the first wheel hub housing, the hydraulic cylinder comprising a hollow piston sleeve which projects from the knuckle housing, and a piston shaft which is slidably and sealingly received by the piston sleeve, the piston shaft projecting from the first wheel hub housing.

11. A telescopic axle assembly for a driven steerable wheel, said axle assembly comprising:
- a knuckle housing pivotally mounted to a vehicle frame;
- a drive shaft rotatably received by the knuckle housing, the drive shaft extending through the knuckle housing;
- a first wheel hub housing slidably coupled to the knuckle housing;
- a second wheel hub housing rotatably mounted to the first wheel hub housing;
- a transmission which transmits torque between the drive shaft and the second wheel hub housing;
- an actuator for axially moving the wheel hub housings with respect to the knuckle housing and the drive shaft, the actuator comprising a hydraulic cylinder which is coupled between the knuckle housing and the first wheel hub housing, the hydraulic cylinder comprising a hollow piston sleeve which projects from the knuckle housing, and a piston shaft which is slidably and sealingly received by the piston sleeve, the piston shaft projecting from the first wheel hub housing; and
- a hollow shaft is axially fixed with respect to the wheel hub housings, the hollow shaft having a sun gear formed on an outer surface thereof, the hollow shaft slidably receiving the drive shaft, and the hollow shaft having inner splines which slidably and meshingly engage outer gear teeth formed on the drive shaft;
- a ring gear is supported on the first wheel hub housing; and
- a planet gear is meshingly coupled with the ring gear and with the sun gear.

* * * * *